US012779812B2

(12) United States Patent
Newcomb et al.

(10) Patent No.: US 12,779,812 B2
(45) Date of Patent: Nov. 3, 2026

(54) COMPOSITES WITH INTERNAL SANDWICH CONSTRUCTION

(71) Applicant: GM GLOBAL TECHNOLOGY OPERATIONS LLC, Detroit, MI (US)

(72) Inventors: Bradley Allen Newcomb, Troy, MI (US); Xiaosong Huang, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 153 days.

(21) Appl. No.: 18/538,345

(22) Filed: Dec. 13, 2023

(65) Prior Publication Data

US 2025/0196469 A1 Jun. 19, 2025

(51) Int. Cl.

| | |
|---|---|
| ***B32B 5/06*** | (2006.01) |
| ***B29C 70/70*** | (2006.01) |
| ***B32B 3/04*** | (2006.01) |
| ***B32B 27/08*** | (2006.01) |
| ***B32B 27/12*** | (2006.01) |

(Continued)

(52) U.S. Cl.

CPC .............. *B32B 5/073* (2021.05); *B29C 70/70* (2013.01); *B32B 3/04* (2013.01); *B32B 27/08* (2013.01); *B32B 27/12* (2013.01); *B29K 2101/12* (2013.01); *B29K 2995/0026* (2013.01); *B29K 2995/0029* (2013.01); *B29L 2031/30* (2013.01); *B29L 2031/3002* (2013.01); *B32B 2255/10* (2013.01); *B32B 2260/021* (2013.01); *B32B 2260/046* (2013.01); *B32B 2262/02* (2013.01); *B32B 2262/10* (2013.01);

(Continued)

(58) Field of Classification Search

CPC ........... B32B 5/073; B32B 3/04; B32B 27/08; B32B 27/12; B32B 2255/10; B32B 2260/021; B32B 2260/046; B32B 2262/02; B32B 2262/10; B32B 2262/101; B32B 2307/412; B32B 2307/414; B32B 2307/584; B32B 2262/106; B32B 27/06; B32B 3/08; B32B 5/02; B32B 33/00; B29C 70/70; B29K 2101/12; B29K 2995/0026; B29K 2995/0029; B29L 2031/30; B29L 2031/3002

See application file for complete search history.

(56) References Cited

U.S. PATENT DOCUMENTS 11,331,890 B1 * 5/2022 Zhao ......................... B32B 5/02
11,420,683 B2 8/2022 Newcomb et al.

(Continued)

FOREIGN PATENT DOCUMENTS

DE 102013215332 A1 2/2015
DE 102020129061 A1 6/2021

(Continued)

OTHER PUBLICATIONS

German Office Action from counterpart DE1020241023570, dated Sep. 23, 2024.

*Primary Examiner* — Brian Handville

(57) ABSTRACT

A molded part includes a composite sandwich structure including a first substrate including a first reinforcing fiber attached to the first substrate using thread. A resin layer is arranged adjacent to the first substrate. A second substrate is arranged adjacent to the resin layer and includes a second reinforcing fiber attached to the second substrate using thread. An over-molding resin encapsulates at least one side of the composite sandwich structure.

20 Claims, 6 Drawing Sheets

(51) Int. Cl.
*B29K 101/12* (2006.01)
*B29L 31/30* (2006.01)

(52) U.S. Cl.
CPC ... *B32B 2262/101* (2013.01); *B32B 2307/412* (2013.01); *B32B 2307/414* (2013.01); *B32B 2307/584* (2013.01)

(56) References Cited

U.S. PATENT DOCUMENTS

| | | | | |
|---|---|---|---|---|
| 11,541,939 | B2 | 1/2023 | Newcomb et al. | |
| 2013/0142988 | A1 | 6/2013 | Grelin | |
| 2016/0176153 | A1* | 6/2016 | Dietz | B29C 51/14 428/116 |
| 2021/0170701 | A1* | 6/2021 | Zhao | B32B 27/12 |
| 2022/0212449 | A1 | 7/2022 | Newcomb et al. | |

FOREIGN PATENT DOCUMENTS

| | | | |
|---|---|---|---|
| DE | 102020129065 | A1 | 6/2021 |
| DE | 102021111884 | A1 | 6/2022 |
| WO | WO-2005105435 | A1 | 11/2005 |

* cited by examiner

COMPOSITES WITH INTERNAL SANDWICH CONSTRUCTION

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to composites, and more particularly to composites with an internal sandwich construction.

The efficiency of a vehicle is impacted by the weight of the vehicle. To reduce weight, some vehicles use structural composites instead of stamped steel or aluminum.

SUMMARY

A molded part includes a composite sandwich structure including a first substrate including a first reinforcing fiber attached to the first substrate using thread. A resin layer is arranged adjacent to the first substrate. A second reinforcing fiber is arranged adjacent to the resin layer. An over-molding resin encapsulates at least one side of the composite sandwich structure.

In other features, the second reinforcing fiber is attached to a second substrate using thread. The first reinforcing fiber is commingled with a first fiber comprising thermoplastic resin. The second reinforcing fiber is commingled with a second fiber comprising the thermoplastic resin. The first substrate and the second substrate comprise the thermoplastic resin. The first substrate including the first reinforcing fiber and the second substrate including the second reinforcing fiber are compression molded prior to encapsulation in the over-molding resin. The over-molding resin comprises the thermoplastic resin.

In other features, the first reinforcing fiber comprises a dry reinforcing fiber, the second reinforcing fiber is attached to the second substrate using thread, the second reinforcing fiber comprises a dry reinforcing fiber, and the first substrate and the second substrate are selected from a group consisting of a glass mat fabric, a transparent thermoset film, and a transparent thermoplastic film. The first substrate including the first reinforcing fiber and the second substrate including the second reinforcing fiber are infused with a thermosetting resin.

In other features, the resin layer comprises a solid resin layer selected from a group consisting of a neat polymer, a thermoplastic honeycomb, a mineral filled polymer, a particle filled polymer, a fiber filled polymer, and a glass bubble filled polymer. The first reinforcing fiber comprises one or more fibers selected from a group consisting of carbon fiber, glass fiber, basalt fiber, and combinations thereof. At least one of the first reinforcing fiber and the second reinforcing fiber includes a continuous fiber commingled with a thermoplastic fiber.

In other features, the over-molding resin includes one or more materials selected from a group consisting of polycarbonate (PC), polymethylmethacrylate (PMMA), epoxy, polyamides (PA), polyurethane, polycarbonate/acrylonitrile-butadiene-styrene (PC/ABS), polycarbonate/acrylonitrile-butadiene-styrene/polymethylmethacrylate (PC/ABS/PMMA), poly(aryl-ether-ketone) (PAEK), poly(ether-ketone) (PEK), poly(ether-ether-ketone) (PEEK), polyphenylene sulfide (PPS), thermoplastic polyolefins (TPO), and combinations thereof.

In other features, at least one of the over-molding resin and resin in the resin layer is transparent, translucent, or semi-transparent. A coating layer is arranged on the over-molding resin. The coating layer comprises at least one of a painted layer, a scratch-resistant coating layer arranged on the over-molding resin. The second reinforcing fiber is attached to the first substrate using thread.

A method for manufacturing a molded part includes creating a composite sandwich structure by attaching a first reinforcing fiber to a first substrate using thread; arranging a resin layer adjacent to the first substrate; arranging a second reinforcing fiber adjacent to the resin layer; and encapsulating at least one side of the composite sandwich structure using an over-molding resin.

In other features, the method includes attaching the second reinforcing fiber to a second substrate using thread; commingling the first reinforcing fiber with a first fiber comprising a thermoplastic resin; and commingling the second reinforcing fiber with a second fiber comprising the thermoplastic resin. The first substrate and the second substrate comprise the thermoplastic resin.

In other features, the method includes compression molding the first substrate including the first reinforcing fiber and the second substrate including the second reinforcing fiber prior to encapsulation in the over-molding resin. The over-molding resin comprises the thermoplastic resin.

In other features, the method includes attaching the second reinforcing fiber to a second substrate using thread. The first reinforcing fiber comprises a dry fiber, the second reinforcing fiber comprises the dry fiber, and the first substrate and the second substrate are selected from a group consisting of a glass mat fabric, a transparent thermoset film, and a transparent thermoplastic film.

In other features, the method includes infusing the first reinforcing fiber, the second reinforcing fiber, the first substrate, and the second substrate with a thermosetting resin. The resin layer comprises a solid resin layer selected from a group consisting of a neat polymer, a thermoplastic honeycomb, a mineral filled polymer, a particle filled polymer, a fiber filled polymer, and a glass bubble filled polymer.

In other features, the first reinforcing fiber comprises one or more fibers selected from a group consisting of carbon fiber, glass fiber, basalt fiber, and combinations thereof. The method includes forming a coating layer comprising at least one of a painted layer, a scratch-resistant coating layer on the over-molding resin.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1A:
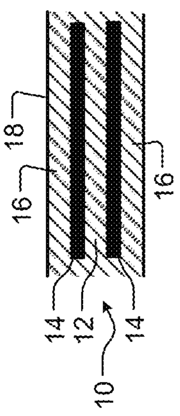
FIGS. 1A to 1E are side cross sectional views of examples of composite structures including an internal sandwich structure with reinforcing fibers on opposite sides of a central resin layer according to the present disclosure.
Figure 1B:
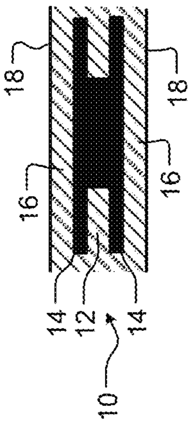

While the following description relates to composite structures used in a vehicle, the composites can be used in non-vehicular applications.

A molded part according to the present disclosure includes a composite structure with an internal sandwich that is overmolded on at least one side. The composite structure with the internal sandwich improves flexural stiffness of the molded part. The internal sandwich includes first and second reinforcing fibers that are separated in a thickness direction by a central resin layer, In some examples, the resin layer is a solid resin layer including a resin fiber (e.g., a neat polymer), a resin sheet, and/or a honeycomb resin core.

In some examples, the reinforcing fibers include continuous reinforcing fibers made of at least one of carbon, glass, or basalt fibers. In some examples, the composite structure is anisotropic such that local stiffness, thermal expansion, strength, and/or other thermo-mechanical properties vary as a function of location within the molded part.

In some examples, the composite structure with the internal sandwich has local non-uniform thickness variations prior to consolidation and/or after consolidation. In some examples, the resin rich layer includes a neat polymer, a thermoplastic honeycomb (sandwich material), a mineral filled polymer, a particle filled polymer, a fiber filled polymer, a glass bubble filled polymer, or other material which provides sufficient backing support to minimize or eliminate reinforcing fiber migration during consolidation. As used herein, neat polymer refers to polymer fabrication using solvent casting involving thin film formation by dissolving the polymer in an appropriate solvent, casting the polymer/solvent solution onto a solid substrate or mold, and then evaporating out the solvent.

In some examples, one or both sides of the sandwich structure are overmolded, infused, or otherwise encapsulated by a thermoplastic or thermoset resin to form the molded part. In some examples, the infusing or over-molding resin comprises a neat polymer, a short fiber filled resin, a long fiber filled resin, a mineral filled polymer, or a combination thereof. In some examples, the composite with the sandwich structure is arranged in a first mold such as an injection mold and a first outer surface is formed. Then, the composite with the sandwich structure (and the first outer surface) is optionally arranged in a second mold and a second outer surface is formed on an opposite side thereof.

In some examples, the molded part is formed using a transparent, translucent, or semi-transparent resin material to allow light to transmit through portions of the molded panel. In other examples, the molded panel includes a sandwich construction made of polymeric composite with metallic structures (instead of reinforcing fibers) separated by a resin rich layer.

In some examples, an outer surface of the molded part is coated with one or more coating layers to enhance durability. In some examples, the coating layer includes paint, film, an ultraviolet (UV) resistant coating (e.g., polymethyl methacrylate (PMMA), and/or a hard coating layer for scratch resistance. In some examples, the hard coating layer includes Momentive AS4700F, although other hard coating layers can be used.

In some examples, the present disclosure relates to a method for manufacturing the molded part including the composite structure with the sandwich construction. The composite structure is formed by infusing a thermoset resin in a dry fiber to form a structural composite. In some examples, the dry fiber is attached by threads to a substrate.

In other features, the fiber reinforcement is commingled with a thermoplastic fiber, consolidated into a structural insert, and overmolded with a thermoplastic resin material.

In some examples, the structural insert is formed through a consolidation process under temperature and/or pressure. In some examples, the commingled fiber is stitched to a substrate prior to consolidation. In some examples, the structural insert is overmolded and fully encapsulated as a centralized layer in the thickness of the structure. In some examples, the structural insert is overmolded on a single side, with the non-exposed body panel serving as a side to be painted.

For example, a molded part according to the present disclosure includes a composite sandwich structure including a first reinforcing fiber attached to a first substrate using thread. A resin layer is arranged adjacent to the first reinforcing fiber. A second reinforcing fiber is attached to a second substrate using thread and arranged adjacent to the resin layer. An over-molding resin encapsulates at least one side of the composite sandwich structure.

In some examples, the first reinforcing fiber is commingled with a first fiber comprising thermoplastic resin. The second reinforcing fiber is commingled with a second fiber comprising the thermoplastic resin. The first substrate and the second substrate comprise the thermoplastic resin. The first reinforcing fiber, the second reinforcing fiber, the first substrate, and the second substrate are compression molded prior to encapsulation in the over-molding resin. The over-molding resin comprises the thermoplastic resin.

In some examples, the first reinforcing fiber comprises a dry reinforcing fiber. The second reinforcing fiber comprises a dry reinforcing fiber. The first substrate and the second substrate are selected from a group consisting of a glass mat fabric, a transparent thermoset film, and a transparent thermoplastic film. The first reinforcing fiber, the second reinforcing fiber, the first substrate, and the second substrate are infused with a thermosetting resin.

Figure 1C:
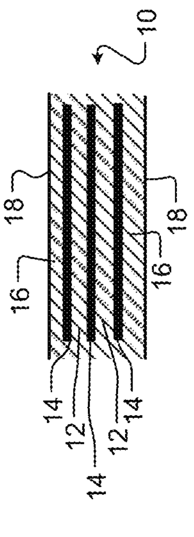
Figure 1D:
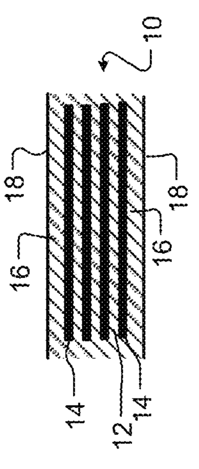
Figure 1E:
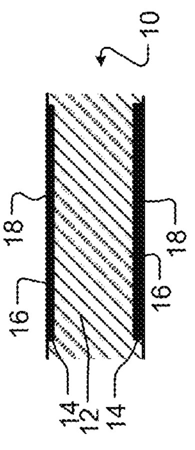
Figure 2:
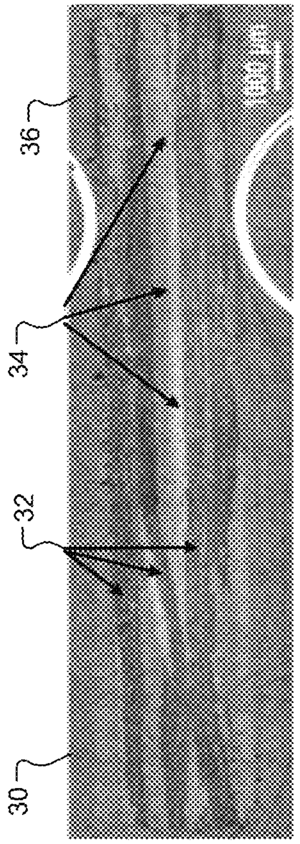
FIG. 2 is a side cross sectional view of an example of a composite structure including an internal sandwich structure with reinforcing fibers on opposite sides of a central resin layer according to the present disclosure.

Referring now to FIGS. 1A to 2, examples of composite structures including an internal sandwich with reinforcing fibers are shown. In FIG. 1A, a sandwich 10 includes reinforcing fibers 14 on opposite sides of a separating central resin layer 12. The internal sandwich 10 is consolidated in resin 16. A coating 18 such as paint, an ultraviolet resistant coating, a scratch resistant coating, a film, or other coating may be used. While two layers of the reinforcing fibers 14 are shown, additional layers can be used as shown in FIGS. 1C and 1D with intervening resin layers. In FIG. 1B, the reinforcing fibers 14 on opposite sides of the internal sandwich 10 can be connected together. In FIG. 1E, the reinforcing fibers can be spaced adjacent to a top surface and a bottom surface. An over-molding step may be performed after consolidation. In FIG. 2, a composite 30 includes the internal sandwich including continuous reinforcing fibers 32, a separating central resin layer 34, and an encapsulating resin 36.

Figure 3A:
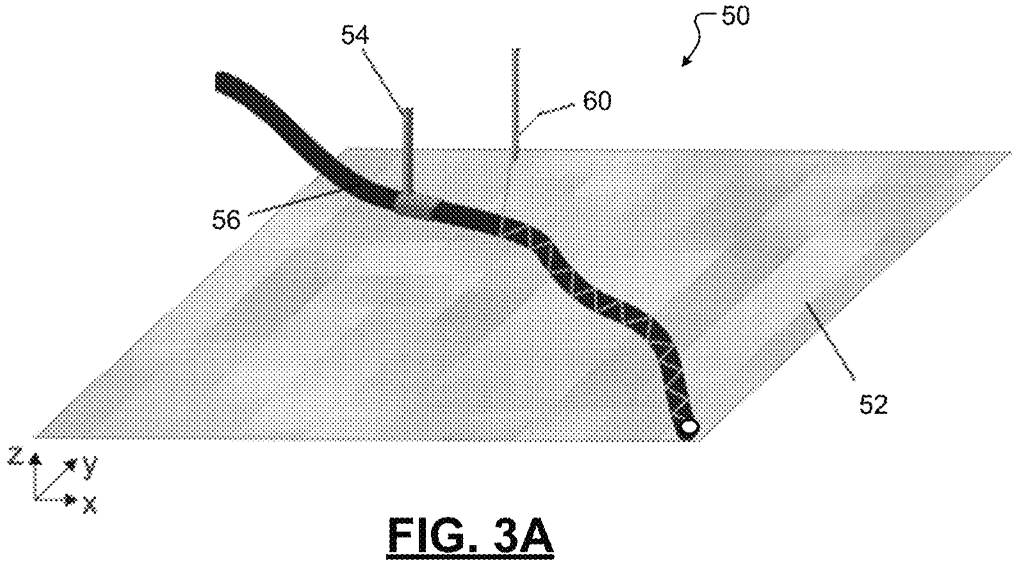
FIG. 3A is a perspective view illustrating an example of stitching of a reinforcing fiber(s) and/or the central resin layer onto a substrate according to the present disclosure.
Figure 3B:
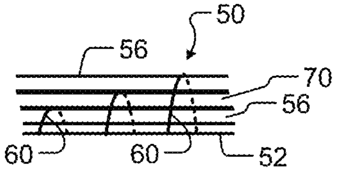
FIG. 3B is a side cross sectional view of an internal sandwich including a reinforcing fiber, a central resin layer, and a reinforcing fiber according to the present disclosure.
Figure 4:
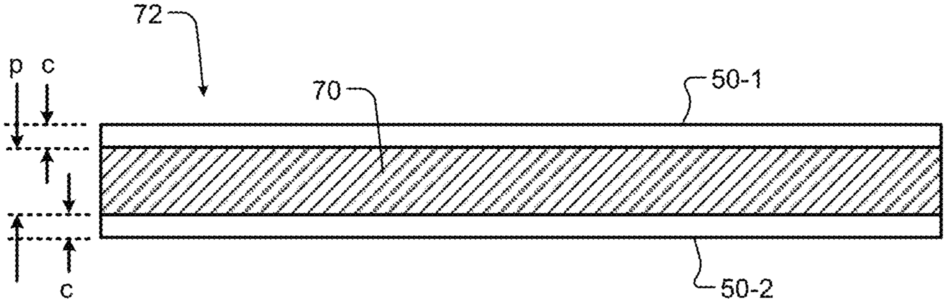
FIG. 4 is a side cross sectional view of an example of an internal sandwich structure including a reinforcing fiber, a central resin layer including one of a resin fiber, a resin sheet or honeycomb resin core, and a reinforcing fiber according to the present disclosure.

Referring now to FIGS. 3A to 4, stitching of a reinforcing fiber onto a substrate is shown. In FIGS. 3A and 3B, a preform 50 includes reinforcing fibers 56 attached by thread 60 onto a substrate 52. The reinforcing fibers 56 pass through a guide 54 that is moved relative to the substrate 52 to define a pattern. In some examples, tailored fiber placement (TFP) is used and the guide 54 is directed by a robot. In FIG. 4, two of the preforms 50 are arranged on opposite sides of a central resin layer 70 to form an internal sandwich 72. In some examples, one or both sides of the internal sandwich are consolidated and over-molded using injection molding or compression-injection molding.

In some examples, the substrate 52 includes a polymer sheet acting as a carrier to attach the reinforcing fibers 56 and/or the central resin layers. In some examples, the reinforcing fibers 56 include a commingled fiber such as continuous carbon fibers and polycarbonate fibers (PC). After attaching the reinforcing fibers 56, the central resin layer 70 (e.g., polycarbonate (PC) with no reinforcing fibers) is arranged on the reinforcing fibers 56. Then another reinforcing fiber is attached to the central resin layer 70.

In FIG. 4, an example of a sandwich 72 is shown. The reinforcing fibers 56 are stitched to the substrate 52 and serve as a first reinforcing layer 50-1 of the sandwich 72. In some examples, the total thickness c of the reinforcing fibers 56 in the first reinforcing layer 50-1 after consolidation is in a range from 0.2 mm to 5.0 mm (e.g., 0.5 mm).

In some examples, the central resin layer 70 (e.g., a neat polymer not commingled with reinforcing fibers) is laid down on top of the first reinforcing layer 50-1 prior to consolidation. In some examples, the central resin layer 70 includes a resin fiber (e.g., laid and stitched using TFP) having a thickness p in a range from 0.2 mm to 5.0 mm (e.g., 1.0 mm) after consolidation. A second reinforcing layer 50-2 of the sandwich 72 is stitched on top of central resin layer and serves a second reinforcing layer of the sandwich 72. In some examples, the total thickness c of the reinforcing fibers 56 in the second reinforcing layer after consolidation is in a range from 0.2 mm to 5.0 mm. As can be appreciated, additional layers can be used as shown in FIGS. 1C and 1D. In other examples, the central resin layer 70 comprises a film, sheet or honeycomb resin core arranged between the reinforcing layers 50-1 and 50-2.

Figure 5A:
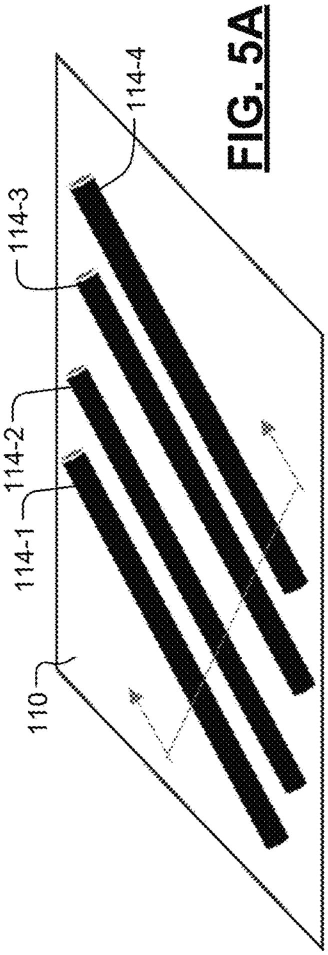
FIGS. 5A to 5C are perspective views of an example of reinforcing fibers and/or separating central resin layers according to the present disclosure.

Referring now to FIGS. 5A to 6D, an example of a method for manufacturing a molded part using a sandwich including reinforcing fibers and/or separating central resin layer is shown. In FIGS. 5A and 6A, reinforcing fibers 114-1, 114-2, 114-2, and 114-4 are stitched/embroidered onto a substrate 110 in a predetermined pattern. Additional reinforcing fibers can be stitched on top of other reinforcing fibers as shown at 114-2 for additional thickness.

Figure 6A:
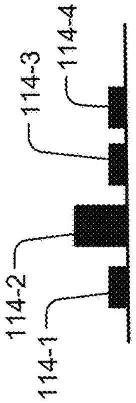
FIGS. 6A to 6D are side cross sectional views of an example of reinforcing fibers, and separating central resin layers during consolidation and over-molding according to the present disclosure.
Figure 6B:
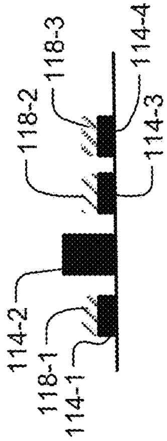
Figure 6C:
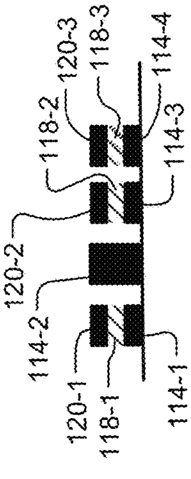
Figure 6D:
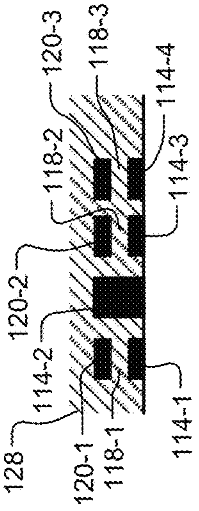
Figure 5B:
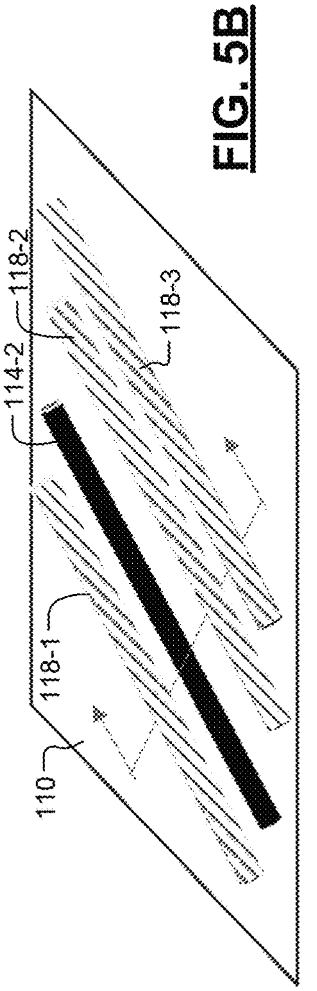
Figure 5C:
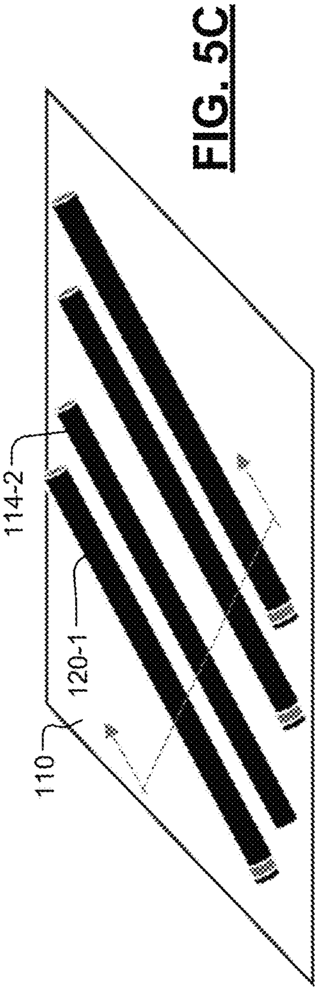

In FIGS. 5B and 6B, separating central resin layers 118-1, 118-2, and 118-3 are stitched on top of the reinforcing fibers 114-1, 114-3, and 114-4, respectively. In FIGS. 5C and 6C, reinforcing fibers 120-1, 120-2, and 120-3 are stitched on top of the separating central resin layers 118-1, 118-2, and 118-3, respectively, to form a sandwich structure. In FIG. 6D, consolidation of the preform, injection molding, or compression-injection molding is performed to complete a final part.

Figure 7:
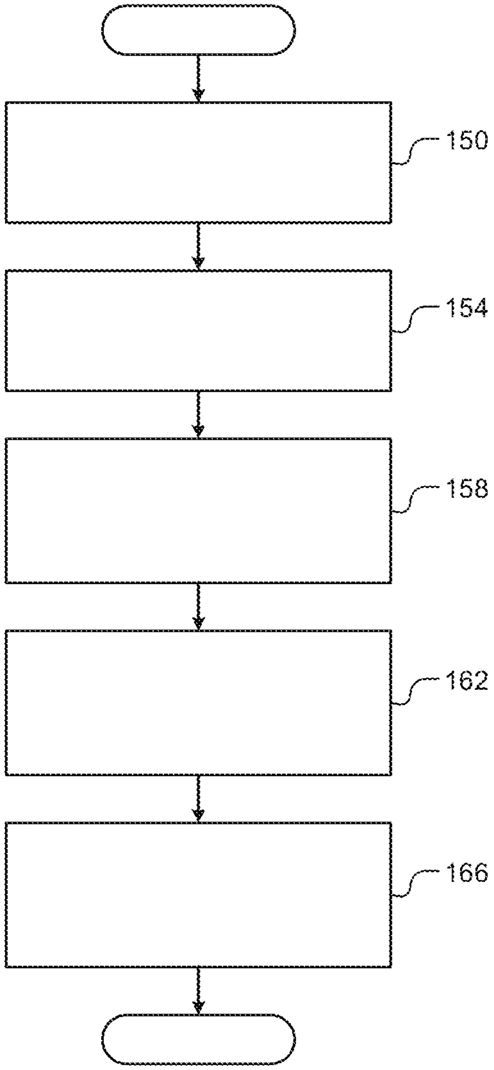
FIG. 7 is a flowchart of an example of a method for manufacturing a composite structure with an internal sandwich with reinforcing fibers and a central resin layer according to the present disclosure.

Referring now to FIG. 7, a method for manufacturing a composite with an internal sandwich with reinforcing fibers is shown. At 150, reinforcing fiber(s) are stitched/embroidered onto a substrate. At 154, a separating resin fiber/sheet/honeycomb is stitched/embroidered on selected portions of the reinforcing fiber. At 158, reinforcing fiber is stitched/embroidered on selected portions of the reinforcing fiber or separating central resin layer. At 162, other reinforcing fibers or separating central resin layer(s) are stitched as needed. At 166, the preform is consolidated and/or injection or injection-compression molding is used to form a final part.

Figure 8B:
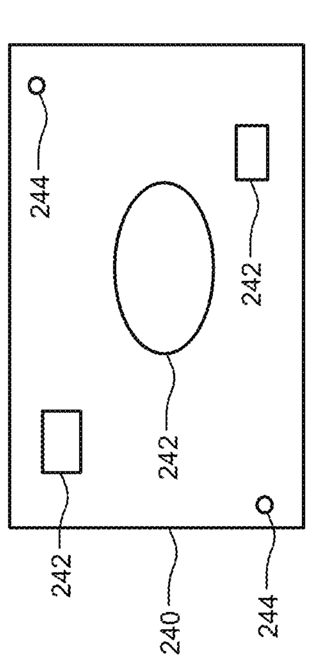
FIG. 8B is a plan view of an example of a metallic insert according to the present disclosure.
Figure 9A:
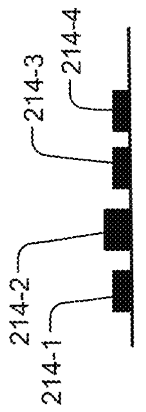
FIGS. 9A to 9C are side cross sectional views of an example of metallic inserts and a separating central resin layer during consolidation and over-molding according to the present disclosure.
Figure 9B:
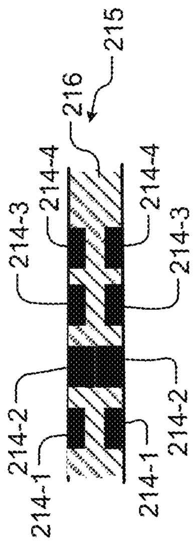
Figure 8A:
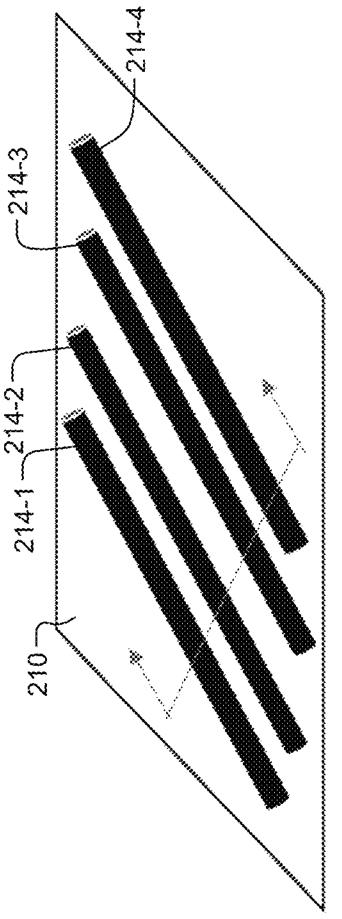
FIG. 8A is a perspective view of an example of metallic inserts for a composite including an internal sandwich with metallic inserts and a central resin layer according to the present disclosure.

Referring now to FIGS. 8A and 8B, in the preceding examples, the sandwich included reinforcing fibers and a supporting resin layer. In other examples, the sandwich includes metallic inserts and a supporting resin layer. In FIGS. 8A and 9A, a set of metallic inserts 214-1, 214-2, 214-3, and 214-4 are arranged in a predetermined pattern. In some examples, the set of metallic inserts 214-1, 214-2, 214-3, and 214-4 are arranged on a support (or attached to a substrate (e.g., a polymer substrate) using adhesive or stitching or another attachment method). A second set of metallic inserts 214 is prepared.

Figure 9C:
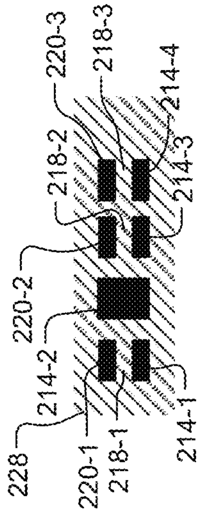

A sandwich 215 is created by a supporting resin layer(s) 216 arranged between the sets of metallic inserts 214. In some examples, the sets of metallic inserts 214 are mirror images. In other examples, the sets of metallic inserts 214 are not mirror images. In FIG. 9C, the sandwich 215 (including the sets of metallic inserts 214 and the supporting resin layer(s) 216) is consolidated, injection molded, and/or compression-injection molded in resin 228 to form a part.

While a multi-piece metallic insert is shown in FIG. 8B, a metallic insert 240 can include a one or more pieces arranged on each side of the resin layer and including one or more holes 242 to allow flow of resin during consolidation. The metallic insert may include holes 244 for receiving locating pins to position the metallic insert(s) above and below the supporting resin layer(s).

Figure 10:
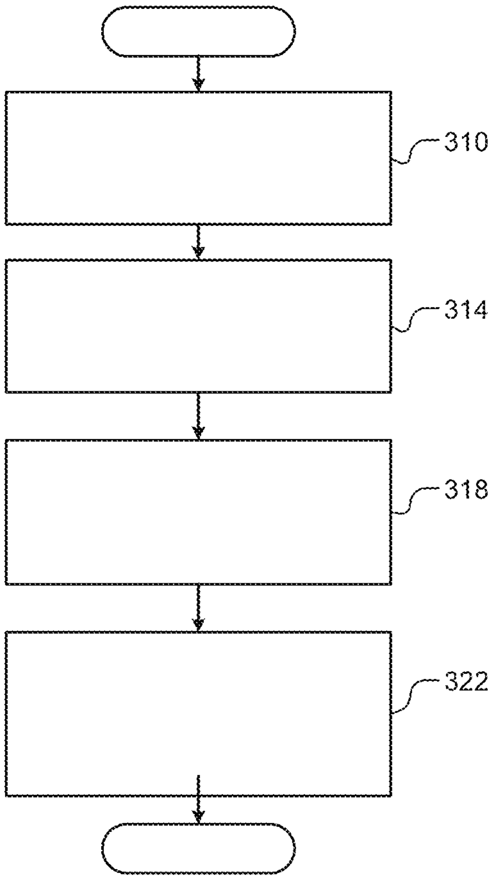
FIG. 10 is a flowchart of an example of a method for manufacturing a composite with an internal sandwich with metallic inserts and a separating central resin layer according to the present disclosure.

Referring now to FIG. 10, a method for manufacturing a composite with an internal sandwich with metallic inserts is shown. At 310, first and second metallic inserts and/or sets of metallic inserts are cut (e.g., laser cut), machined or otherwise manufactured. At 314, one or more supporting resin layers are placed between the first and second metallic components and/or sets of metallic components to form a sandwich. At 318, the sandwich is consolidated. At 322, the part is completed using resin infusion (thermoset), injection molding (thermoplastic), or injection-compression molding (thermoplastic).

In some examples, the reinforcing fibers include one or more fibers selected from a group consisting of carbon, glass, basalt, flax, hemp, pineapple, and cellulose. In some examples, first fibers (selected from a group consisting of carbon, glass, basalt, flax, hemp, pineapple, and cellulose) are commingled with second fibers selected from a group consisting of polycarbonate, nylon, polyetheretherketone (PEEK), polyetherimide (PEI), polyphenylene sulfide (PPS), polyester, polyethylene, and polypropylene in order to consolidate the fiber preform. In some examples, the plurality of reinforcing fibers has a shape selected from the group consisting of cylindrical, flat, or both cylindrical and flat. In some examples, the reinforcing fibers are in the form of dry fibers that are encapsulated in a thermoset or thermoplastic resin to form a structural composite.

In some examples, the resin includes one or more materials selected from a group consisting of polycarbonate (PC), polymethylmethacrylate (PMMA), epoxy, polyamides (PA), polyurethane, polycarbonate/acrylonitrile-butadiene-styrene (PC/ABS), polycarbonate/acrylonitrile-butadiene-styrene/polymethylmethacrylate (PC/ABS/PMMA), poly(aryl-ether-ketone) (PAEK), poly(ether-ketone) (PEK), poly (ether-ether-ketone) (PEEK), polyphenylene sulfide (PPS), thermoplastic polyolefins (TPO), and combinations thereof. In some examples, the resin may be a thermoset resin or a thermoplastic resin that is substantially transparent when free of fibers or opaque.

In some examples, the composite is painted or an ultraviolet coating is applied. In other examples, the composite is covered with film. In some examples, the composite panel is formed using a transparent, translucent, or semi-transparent resin material to allow light to transmit through portions of the composite panel. In some examples, the structural insert is encapsulated in resin mixed with short fibers, long fibers, and/or one or more minerals.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

What is claimed is:

1. A molded part comprising:
- a composite sandwich structure comprising:
  - a first substrate;
  - first reinforcing fibers attached to the first substrate using thread;
  - separating central resin layers arranged adjacent to the first substrate, the separating central resin layers stitched to selected ones of the first reinforcing fibers but not to all of the first reinforcing fibers;
  - second reinforcing fibers stitched onto the separating central resin layers; and
  - at least one third reinforcing fiber stitched onto at least one of the first reinforcing fibers not stitched to the separating central resin layers; and
- an over-molding resin encapsulating at least one side of the composite sandwich structure.

2. The molded part of claim 1, further comprising a second substrate, wherein:
- the second reinforcing fibers are is attached to the second substrate using thread,
- at least one of the first reinforcing fibers is commingled with a first fiber comprising thermoplastic resin,
- at least one of the second reinforcing fibers is commingled with a second fiber comprising the thermoplastic resin, and
- the first substrate and the second substrate comprise the thermoplastic resin.

3. The molded part of claim 2, wherein:
- the first substrate including the first reinforcing fibers and the second substrate including the second reinforcing fibers are compression molded prior to encapsulation in the over-molding resin, and
- the over-molding resin comprises the thermoplastic resin.

4. The molded part of claim 1, further comprising a second substrate, wherein:
- the second reinforcing fibers are is attached to the second substrate using thread,
- at least one of the first reinforcing fibers comprises a dry reinforcing fiber,
- at least one of the second reinforcing fibers comprises a dry reinforcing fiber, and
- the first substrate and the second substrate are selected from a group consisting of a glass mat fabric, a transparent thermoset film, and a transparent thermoplastic film.

5. The molded part of claim 4, wherein the first substrate including the first reinforcing fibers and the second substrate including the second reinforcing fibers are infused with a thermosetting resin.

6. The molded part of claim 1, wherein the separating central resin layers are selected from a group consisting of a neat polymer, a thermoplastic honeycomb, a mineral filled polymer, a particle filled polymer, a fiber filled polymer, and a glass bubble filled polymer.

7. The molded part of claim 1, wherein at least one of the first reinforcing fibers comprises one or more fibers selected from a group consisting of carbon fiber, glass fiber, basalt fiber, and combinations thereof.

8. The molded part of claim 1, wherein at least one of the first reinforcing fibers and the second reinforcing fibers includes a continuous fiber commingled with a thermoplastic fiber.

9. The molded part of claim 1, wherein the over-molding resin includes one or more materials selected from a group consisting of polycarbonate (PC), polymethylmethacrylate (PMMA), epoxy, polyamides (PA), polyurethane, polycarbonate/acrylonitrile-butadiene-styrene (PC/ABS), polycarbonate/acrylonitrile-butadiene-styrene/polymethylmethacrylate (PC/ABS/PMMA), poly(aryl-ether-ketone) (PAEK), poly(ether-ketone) (PEK), poly(ether-ether-ketone) (PEEK), polyphenylene sulfide (PPS), thermoplastic polyolefins (TPO), and combinations thereof.

10. The molded part of claim 1, wherein at least one of the over-molding resin and resin in the separating central resin layers is transparent, translucent, or semi-transparent.

11. The molded part of claim 1, further comprising a coating layer arranged on the over-molding resin, wherein the coating layer comprises at least one of a painted layer or a scratch-resistant coating layer.

12. The molded part of claim 1, wherein the separating central resin layers and the second reinforcing fibers are attached to the first substrate using thread.

13. A method for manufacturing a molded part comprising:

creating a composite sandwich structure by:

attaching first reinforcing fiber to a first substrate using thread;

arranging separating central resin layers adjacent to the first substrate, the separating central resin layers stitched to selected ones of the first reinforcing fibers but not to all of the first reinforcing fibers;

arranging second reinforcing fibers adjacent to the resin layer and stitched onto the separating central resin layers; and arranging at least one third reinforcing fiber adjacent to and stitched onto at least one of the first reinforcing fibers not stitched to the separating central resin layers; and encapsulating at least one side of the composite sandwich structure using an over-molding resin.

14. The method of claim 13, further comprising:

attaching the second reinforcing fibers to a second substrate using thread;

commingling at least one of the first reinforcing fibers with a first fiber comprising a thermoplastic resin; and commingling at least one of the second reinforcing fibers with a second fiber comprising the thermoplastic resin, wherein the first substrate and the second substrate comprise the thermoplastic resin.

15. The method of claim 14, further comprising:

compression molding the first substrate including the first reinforcing fibers and the second substrate including the second reinforcing fibers prior to encapsulation in the over-molding resin, wherein the over-molding resin comprises the thermoplastic resin.

16. The method of claim 13, wherein:

the second reinforcing fibers are attached to a second substrate using thread, at least one of the first reinforcing fibers comprises a dry fiber, at least one of the second reinforcing fibers comprises the dry fiber, and the first substrate and the second substrate are selected from a group consisting of a glass mat fabric, a transparent thermoset film, and a transparent thermoplastic film.

17. The method of claim 16, further comprising infusing the first reinforcing fibers, the second reinforcing fibers, the first substrate, and the second substrate with a thermosetting resin.

18. The method of claim 13, wherein the separating central resin lavers are selected from a group consisting of a neat polymer, a thermoplastic honeycomb, a mineral filled polymer, a particle filled polymer, a fiber filled polymer, and a glass bubble filled polymer.

19. The method of claim 13, wherein at least one of the first reinforcing fibers comprises one or more fibers selected from a group consisting of carbon fiber, glass fiber, basalt fiber, and combinations thereof.

20. The method of claim 13, further comprising forming a coating layer on the over-molding resin, wherein the coating layer comprises at least one of a painted layer or a scratch-resistant coating layer.

* * * * *